Aug. 27, 1957  L. J. HAWORTH  2,804,613
SHIP CENTERED P.P.I.
Filed May 3, 1946  2 Sheets-Sheet 1

INVENTOR
LELAND J. HAWORTH

BY  M. O. Hayes
ATTORNEY

United States Patent Office 2,804,613
Patented Aug. 27, 1957

2,804,613

SHIP CENTERED P. P. I.

Leland J. Haworth, Champaign, Ill., assignor, by mesne assignments, to the United States of America as represented by the Secretary of the Navy Application May 3, 1946, Serial No. 666,884

10 Claims. (Cl. 343—11)

This invention relates to remote indicators in radar relay systems and more specifically to means for eliminating the visual effects of relatiive motion between the searching radar and a remote indicator.

Radar relay systems employing an airborne radar are in use for searching a given area normally around a parent ship, or other surface station, carrying the remote indicators. The data obtained by the airborne radar include the parent ship or surface station as a target on its indicator. When this data is relayed to the ship the aircraft will appear at the center of the pattern and the ship itself will appear at the appropriate range and bearing from the aircraft. As the aircraft moves the position of the ship on the remote indicators will move correspondingly. This relative motion between the searching aircraft and the ship is undesirable and the motion of any target as it appears on the shipboard indicator will include the relative motion between the aircraft and the ship. Such a presentation requires double plotting in determining the course and speed of a target from the ship.

Therefore it is an object of this invention to remove the effects of the relative motion between aircraft and ship at the remote indicator of a radar relay system.

Another object of this invention is to provide a means of centering the remote indicators about the ship rather than the aircraft to permit easier tracking of targets.

A further object of this invention is to provide a means of more accurately centering the ship on remote indicators by using one remote indicator to provide data for centering the remainder of said remote indicators.

These and other objects will be apparent from the following specification when taken with the accompanying drawings in which.

Figure 1:
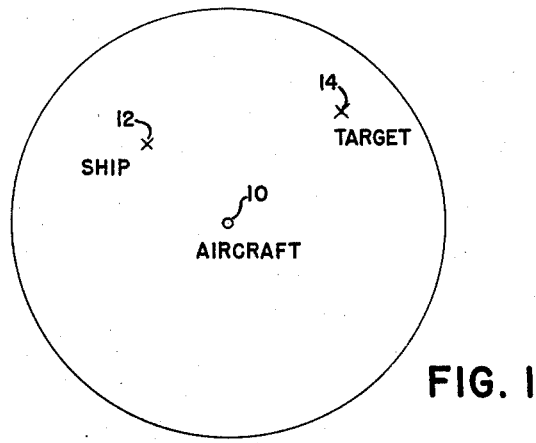
Fig. 1 illustrates the normal presentation encountered.

A typical example of the presentation obtained without off-centering the pattern is shown in Fig. 1 where point 10 indicates the aircraft carrying the radar, point 12 shows the parent ship where the remote indicators are located, and point 14 shows a target at a particular range and bearing from the point 10. As the aircraft moves the positions of ship 12 and target 14 will change. To determine course and speed of target 14, ship 12 must be plotted as it moves along with target 14 to get range and bearing from ship 12 to target 14. By off-centering the pattern a distance at all times proportional to the position of the aircraft relative to the ship 12, the ship may be kept at the center of the pattern and eliminate the need for double plotting.

Figure 2:
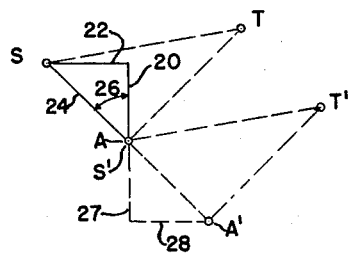
Fig. 2 is a vertor diagram of the data shown in Fig. 1 which also indicates the corrective components provided by this invention.

Referring to Fig. 2 it may be seen that in order to keep the ship stationary on the indicator it is necessary to deflect the entire pattern by the Cartesian components 20 and 22 or the polar components, radius 24 and angle 26. These are the only deflections necessary to position ship 12 at the center of the tube and it makes little difference, in principle, whether Cartesian or polar coordinates are used. It is, however, sometimes desirable to use the indicator with additional off-centering and in such cases it is desirable to use Cartesian coordinates since additions of the needed voltage are more easily obtained. Because of this and the fact that tracking information is more readily obtained and transmitted in the Cartesian form, this means is employed herein.

The means for producing the required Cartesian voltages will now be discussed with reference to Fig. 3. One means involves tracking on an indicator whose pattern is displaced by the tracking process. This involves keeping the indication 12, Fig. 1, corresponding to the ship, beneath a mark at the center of the cathode-ray tube face. The disadvantage here is that the displacement needed to center the ship must be estimated, since the persistent target does not move with the origin as the displacement is entered. The means used in this invention involves a separate remote indicator 30 Fig. 3 which presents the information received from the aircraft as shown in Fig. 1. A polished glass or transparent plate 32 is placed at an angle in front of indicator 30. A transparent plotting board 34 is placed below the plate 32 with a light source (not shown) beneath it. A reference mark 35 is etched on the board 34 and the light (not shown) projects this marker onto plate 32. Handwheel 36 connects through a threaded shaft 37 to potentiometer 40. When it is turned it moves the potentiometer 40 and the plate 34 back and forth causing the marker to move back and forth across the plate 32. Handwheel 38 also connects through a threaded shaft 39 to potentiometer 42. When it is turned it turns the potentiometer 42 and the plate 34 moves back and forth normal to the movement obtained by turning handwheel 36, causing the marker to move up and down on the plate 32.

When controls 36 and 38 are positioned such that the marker 35 projected on plate 32 appears at the center of indicator 30, there will be no output from potentiometers 40 or 42. When crank 36 is turned, potentiometer 40 puts out a voltage proportional to the horizontal distance and direction the marker 35 is moved. In the same manner, control 38 varies the voltage output of potentiometer 42 proportional to the vertical distance and direction the marker is moved.

The two handwheels 36 and 38 are turned manually to position the marker on the ship 12 Fig. 1. When the marker is placed in this manner, potentiometer 42 will put out a voltage which will shift the center down a distance 27 Fig. 2 and potentiometer 40 will put out a voltage which shifts the center over a distance 28 Fig. 2. This will move the ship 12 into the center on all remote indicators.

Figure 4:
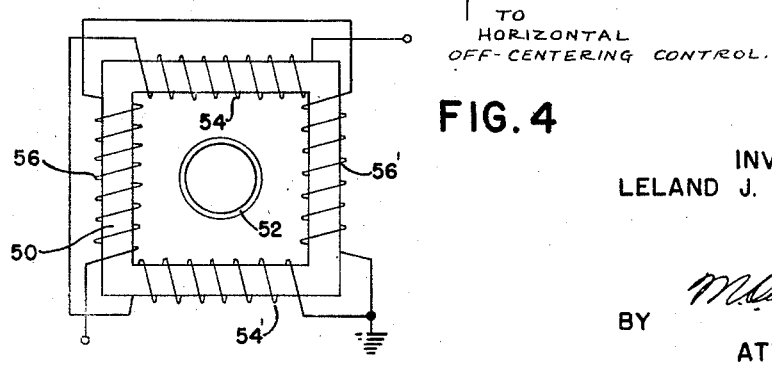
Fig. 4 illustrates one means of accomplishing the objects of this invention with one type of indicator.

Indicators of the plan position type used here may be provided with the necessary off-centering fields by placing an extra coil around the tube as shown in Fig. 4. Coil 52 represents the conventional rotating sweep coil of the indicator. The current through coils 54 and 54' is made to vary in proportion to the change in potentiometer 42 and similarly the current in coils 56 and 56' is made to vary in proportion to the change in potentiometer 40. The currents through these coils position the origin of the pattern on the indicator and since the controls 36 and 38 will vary these currents in proportion to their movement, the pattern may be displaced to keep the ship 12 Fig. 1 at the center of the remaining remote indicators. This system is used preferably on rotating coil type plan position indicator, but the embodiment to be described below is preferable on stationary coil type indicators.

Figure 5:
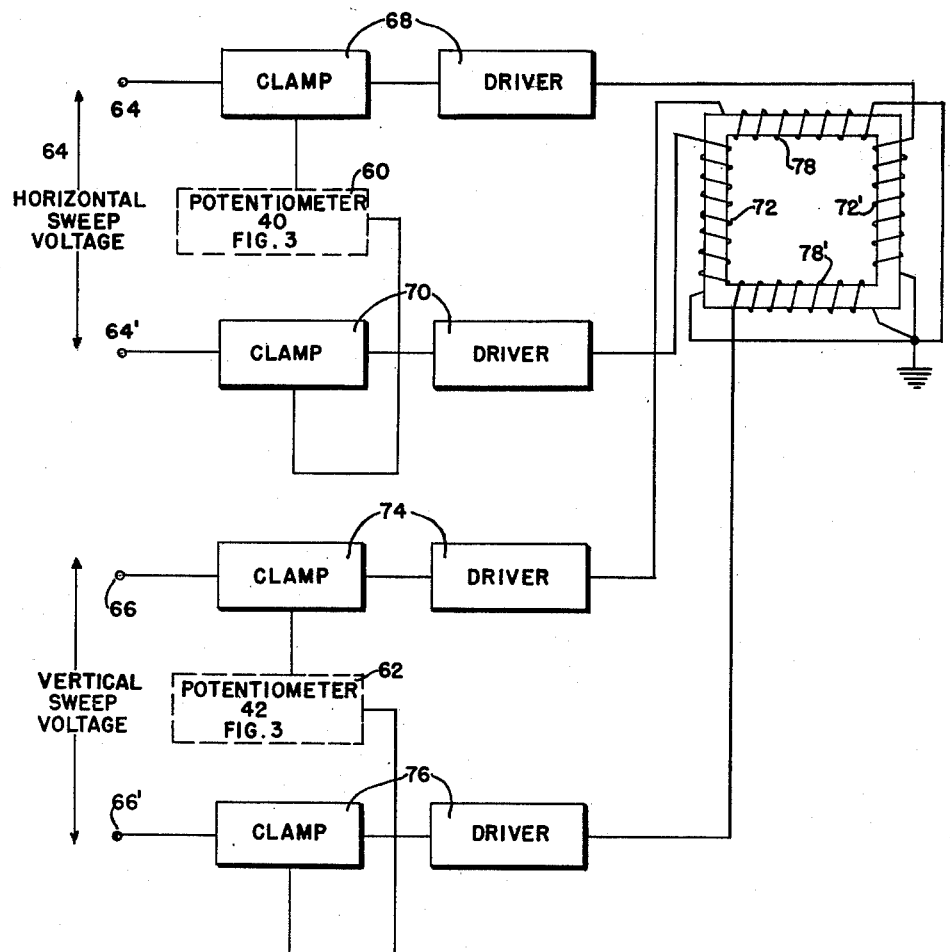
Fig. 5 is a block diagram which illustrates another means of providing the displacement desired by this invention as shown in Fig. 2.

A conventional type P. P. I. fixed coil sweep circuit is shown in Fig. 5 with the potentiometers 40 and 42 Fig. 3 connected in as shown by the dotted blocks 60 and 62. Horizontal sweep voltages are applied at terminals 64 and 64' to the clamp and driver circuits 68 and 70. The two drivers 68, 70 supply the deflection current to the horizontal deflection coils 72 and 72'. In the quiescent condition between sweeps if there is no voltage applied from potentiometer 40 to either clamper then the clampers will position the spot at the horizontal center of the tube. In similar fashion vertical sweeps are applied at terminals 66 and 66' to clamp and driver circuits 74 and 76. The two drivers supply the deflection current to the vertical deflection coils 78 and 78'. Between sweeps, if there is no voltage applied to either clamper from potentiometer 42, the clampers 74 and 76 will position the spot at the vertical center of the tube.

Figure 3:
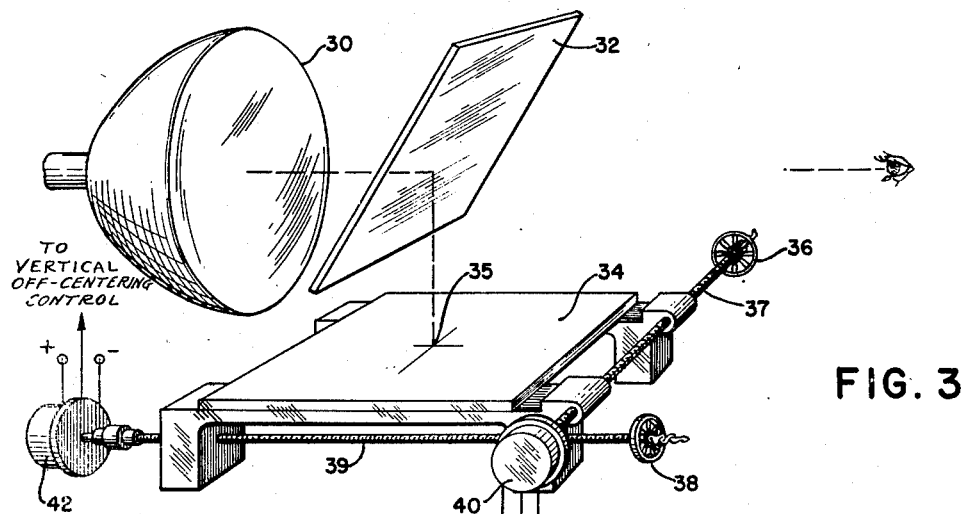
Figure 3 is a diagram of some of the components of this invention illustrative of their use.
Figure 6:
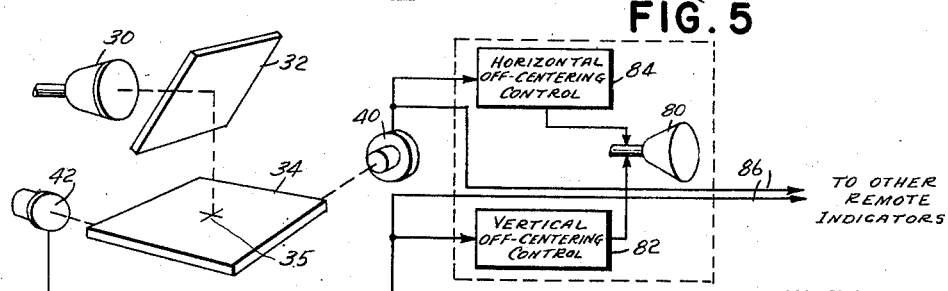
Fig. 6 illustrates an indicating system embodying the present invention.

The relationship between the apparatus of Fig. 3 and the off-centering circuits of Figs. 4 and 5 is illustrated in Fig. 6. Indicator 30, potentiometers 40 and 42, plate 32, board 34 and reference mark 35 of Fig. 6 are identical to correspondingly numbered elements in Fig. 3. A remote indicator 80 is provided for displaying the ship-centered indication. The signal from potentiometer 42 is applied to vertical off-centering control 82 while the signal from potentiometer 40 is applied to horizontal off-centering control 84. Controls 82 and 84 are connected in turn to indicator 80. If indicator 80 is of the rotating coil type, the controls 82 and 84 and the connections to indicator 80 represent a circuit similar to that shown in Fig. 4.

If indicator 80 is of the stationary coil type, controls 82 and 84 will take a form similar to Fig. 5 of the drawing. Leads 86 may be provided for connecting the signals from potentiometers to other ship-centered indicators having components corresponding to control 82 and 84 and indicator 80. In the indicator circuit of Fig. 6, the display on indicator 30 will be similar to that shown in Fig. 1 of the drawing while the display on indicator 80 may be centered on the indication 12 of Fig. 1. It will be obvious that the display on indicator 80 may be centered about the target indication 14 appearing on indicator 30 or at any other identifiable point on indicator 40 by positioning the image of reference mark 35 in coincidence with the selected point.

When controls 36 and 38 of Fig. 3 are turned to position the reference mark 35 in coincidence with the selected indication on indicator 30, the voltages developed by potentiometers 40 and 42 are applied to the associated off-centering controls of the other indicators. The center of the off-centered remote indicators will follow the apparent position of the image of marker 35 on the screen of indicator 30.

While the present invention has been described in terms of a plan-position type of indication it should be obvious that the apparatus described will work equally well with other types of two dimensional presentations for example the B type presentation which displays range and azimuth angle information in rectangular coordinates.

It is believed that the construction and operation as well as the advantage of my improved centering for indicators will be apparent from the foregoing detailed description thereof. It will also be apparent that while I have shown and described my invention in a preferred form, changes may be made in the circuit disclosed without departing from the spirit of the invention as sought to be defined in the following claims.

What is claimed is:

1. A radio pulse echo detection system comprising means for transmitting electromagnetic energy pulses and for receiving target reflected echoes from said pulses, first and second indicators, means for relaying target information obtained by said receiving means to said first and second indicators, said transmitting and receiving means being movable in space relative to said indicators, each of said indicators including means for generating a sweep on which said information obtained from said echoes may be displayed, means for projecting a movable reference marker on said first indicator, means for altering the position of said reference marker on said first indicator, and means for altering the origin of said sweep of said second indicator in accordance with the displacement of said reference marker from a reference position.

2. A radio pulse echo detection system comprising means for transmitting electromagnetic energy pulses and for receiving target reflected echoes from said pulses, first and second cathode ray tube indicators, means for relaying target information obtained by said receiving means to said first and second indicators, each indicator providing a two dimensional display of the information obtained from said transmitting and receiving means, means for projecting a movable reference marker on said first indicator, means for altering the position of said marker on said first indicator, and means coupled to said last-mentioned means for displacing said display on said second indicator by an amount dependent upon the magnitude of the displacement of said reference marker from a reference position and in a direction dependent upon the direction of said displacement of said reference marker from said reference position.

3. A radio pulse echo detection system comprising means for transmitting electromagnetic energy pulses and for receiving target reflected echoes from said pulses, first and second cathode ray tube indicators, means for coupling reflected echoes detected by said receiving means to said first and second indicators, each indicator providing a two dimensional display of the information obtained from said transmitting and receiving means, means for projecting a movable reference marker on said first indicator, first and second positioning means for displacing said reference marker in first and second mutually perpendicular directions, respectively, means for moving said display on said second indicator in a first direction by an amount dependent upon the displacement of said marker in said first direction from a reference position, and means for moving said display on said second indicator in a second direction by an amount dependent upon its displacement of said marker in said second direction from said reference position.

4. In a radio pulse echo detection indicator system, a plurality of cathode ray tube indicators, each of said indicators providing a two dimensional display of target information detected by a remote receiver and relayed to said indicators, each of said indicators except the first being provided with first and second display off centering means, means for optically projecting a movable reference marker on the screen of said first indicator, first and second positioning means for displacing said reference marker on said screen in first and second directions respectively, first and second signal generating means coupled to said first and second positioning means respectively, said first and second generating means producing first and second signals respectively proportional to the displacement of said marker in said first and said second directions, means coupling said first signal generating means to said first display off centering means of said indicators other than said first indicator and means coupling said second signal generating means to said second display off centering means of said indicators other than said first indicator.

5. A radio pulse echo detection indicator system comprising a plurality of cathode ray tube indicators, each of said indicators providing a two dimensional display of target information, each of said indicators except the first being provided with first and second display off-centering means, a plate having a reference marker inscribed thereon, means for optically projecting an image of said reference marker on the display of said first indicator, first and second positioning means coupled to said plate and adapted to move said plate in first and second mutually perpendicular directions, movement of said plate in said first and second directions causing corresponding movement of said image in third and fourth mutually perpendicular directions, first and second potentiometers coupled to said first and second positioning means respectively, means coupling said first potentiometer to each of said first display off-centering means, and means coupling said second potentiometer to each of said second display off-centering means whereby the origin of said displays on said indicators other than said first are caused to be centered on the point on the display of said first indicator in coincidence with said image of said reference marker.

6. A radio pulse echo detection indicator system comprising a plurality of cathode ray tube indicators each of said indicators providing a two dimensional display of target information, each of said targets except the first being provided with first and second display off-centering means, a first plate having a reference marker inscribed thereon, said first plate being disposed adjacent and perpendicular to the screen of said first indicator, a second polished transparent plate disposed adjacent to said screen and said first plate and at an angle to said screen and said first plate, first and second positioning means coupled to said first plate and adapted to move said first plate in first and second mutually perpendicular directions in the plane of said first plate, first and second potentiometers mechanically coupled to said first and second positioning means respectively, means electrically coupling said first potentiometer to each of said first display off-centering means, and means electrically coupling said second potentiometer to each of said second display off-centering means.

7. A radio pulse echo detection indicator system comprising a plurality of cathode ray tube indicators, each of said indicators providing a plan position type indication of targets information detected by a remote receiver and forwarded to said indicators, each of said indicators except the first including first and second voltage controlled display off-centering means, a first plate having a reference marker inscribed thereon, said first plate being disposed adjacent and perpendicular to the screen of said first indicator, a second polished transparent plate disposed within the angle formed by said screen and said first plate and substantially parallel to the line of intersection of the plane of said screen and the plane of said first plate, first and second positioning means coupled to said first plate and adapted to move said first plate in first and second mutually perpendicular directions in the plane of said first plate, first and second potentiometers mechanically coupled to said first and second positioning means respectively, means electrically coupling said first potentiometer to each of said first display off-centering means, and means electrically coupling said second potentiometer to each of said second display off-centering means, said potentiometers being adapted to control said off-centering means to center the plan position indications on the indicators other than the first on the point on the plan position indication in coincidence with the apparent position of said reference marker on screen of said first indicator when said first indicator is viewed through said second plate.

8. In combination with an airborne object locating system, having as components thereof a transmitter and a scanning antenna coupled thereto for periodically radiating a rotating directional beam of radio frequency search pulses and a receiver coupled to said antenna for detecting these pulses after their reflections from remote objects, first and second cathode ray tube indicators carried by a mobile object located within the area being scanned by said directional beam of radio frequency search pulses, means for relaying pulses detected by said receiver to the control electrodes of said cathode ray tube indicators, means for presenting on said indicators polar plots of the objects represented by said reflected pulses, the plot on the first cathode ray tube indicator being centered thereon with the origin thereof representing the location of said airborne object locating system, means for deriving a pair of voltages having magnitudes and directions related to the horizontal and vertical displacement of the representation of said mobile object from the center of said first cathode ray tube indicator, and means for coupling said voltages to the beam deflecting apparatus of said second cathode ray tube indicator to locate the origin of the polar plot presented thereon at a position such that the representation of said mobile object appears at the center of the second cathode ray tube indicator.

9. In a system as defined in claim 8 wherein said means for deriving said voltages includes means for projecting a reference mark on the screen of said first cathode ray tube indicator and means responsive to the movement of said mark for generating a first and second voltage whose magnitudes and polarities are related to the horizontal and vertical displacement of said mark from the center of said first cathode ray tube.

10. In a system as defined in claim 9 wherein said means for generating said first and second voltages includes a first and second potentiometer, a source of unidirectional voltage energizing said potentiometers and means for connecting the movable taps of said potentiometers to said projecting means whereby said taps are displaced from the mid-points of their potentiometers in response to the movement of said reference mark from the center of said first cathode ray tube.

References Cited in the file of this patent

UNITED STATES PATENTS

| | | |
|---|---|---|
| 2,406,751 | Emerson | Sept. 3, 1946 |
| 2,421,747 | Englehardt | June 10, 1947 |
| 2,508,562 | Bonner | May 23, 1950 |
| 2,518,968 | Wolff | Aug. 15, 1950 |
| 2,552,172 | Hawes | May 8, 1951 |
| 2,720,645 | Sherwin | Oct. 11, 1955 |